United States Patent
Shechtman et al.

(10) Patent No.: US 9,330,476 B2
(45) Date of Patent: May 3, 2016

(54) GENERATING A MODIFIED IMAGE WITH ADDITIONAL CONTENT PROVIDED FOR A REGION THEREOF

(75) Inventors: Eli Shechtman, Seattle, WA (US); Dan Goldman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 1136 days.

(21) Appl. No.: 12/454,666

(22) Filed: May 21, 2009

(65) Prior Publication Data

US 2010/0296748 A1    Nov. 25, 2010

(51) Int. Cl.
G06K 9/40 (2006.01)
G06T 11/00 (2006.01)

(52) U.S. Cl.
CPC .................................... *G06T 11/00* (2013.01)

(58) Field of Classification Search
None
See application file for complete search history.

(56) References Cited

U.S. PATENT DOCUMENTS

| | | | |
|---|---|---|---|
| 6,018,592 A | 1/2000 | Shinagawa et al. | |
| 6,263,088 B1 | 7/2001 | Crabtree et al. | |
| 6,347,152 B1 | 2/2002 | Shinagawa et al. | |
| 6,987,520 B2 * | 1/2006 | Criminisi | G06T 11/40 345/582 |
| 7,088,870 B2 * | 8/2006 | Perez | G06T 11/40 345/629 |
| 7,336,851 B1 * | 2/2008 | Cote | G06T 11/60 382/282 |
| 7,760,912 B2 | 7/2010 | Dana et al. | |
| 7,773,099 B2 | 8/2010 | Forlines et al. | |
| 7,826,683 B2 * | 11/2010 | Phillips | G06T 15/503 345/622 |
| 8,139,850 B2 | 3/2012 | Maxwell et al. | |
| 8,139,867 B2 | 3/2012 | Maxwell et al. | |
| 8,175,412 B2 * | 5/2012 | Basri | G06K 9/34 382/100 |
| 8,250,481 B2 * | 8/2012 | Klaric | G06K 9/0063 345/473 |
| 2003/0099406 A1 | 5/2003 | Georgiev et al. | |
| 2004/0164996 A1 | 8/2004 | Criminisi et al. | |
| 2005/0128210 A1 | 6/2005 | Berger | |
| 2005/0128211 A1 | 6/2005 | Berger et al. | |
| 2005/0220348 A1 | 10/2005 | Chiu et al. | |
| 2006/0120624 A1 | 6/2006 | Jojic et al. | |
| 2006/0284874 A1 | 12/2006 | Wilson | |
| 2006/0285762 A1 | 12/2006 | Sun et al. | |
| 2007/0025637 A1 | 2/2007 | Setlur et al. | |

(Continued)

OTHER PUBLICATIONS

'phpFlickr' [online] "phpFlickr version 3.1," Jan. 2011, [retrieved on Jan. 26, 2012]. Retrieved from the Internet: <URL: http://phpflickr.com/>. 4 pages.

(Continued)

*Primary Examiner* — Tsung-Yin Tsai
(74) *Attorney, Agent, or Firm* — Kilpatrick Townsend & Stockton LLP

(57) ABSTRACT

An image is displayed in a computer system. The image includes contents having a feature visible therein. The contents have a region thereof defined to be provided with additional content in generating a modified image. An input is received comprising a semantic mark to be placed on the image. The semantic mark indicates an inside-region part inside the region and an outside-region part outside the region. The additional content for the region is determined using a patch-based optimization algorithm applied to the image. The patch-based optimization algorithm (i) identifies the additional content for the inside-region part based on the outside-region part and not on an area of the image that the semantic mark does not indicate, and (ii) identifies the additional content for a remainder of the region without being restricted to the outside-region part. The modified image having the additional content in the region is stored.

20 Claims, 15 Drawing Sheets
(13 of 15 Drawing Sheet(s) Filed in Color)

(56) References Cited

U.S. PATENT DOCUMENTS

| | | | |
|---|---|---|---|
| 2008/0112642 A1* | 5/2008 | Matsushita | G06T 5/005 382/275 |
| 2008/0238942 A1* | 10/2008 | Sun | G06T 11/60 345/634 |
| 2008/0238945 A1 | 10/2008 | Wakizaka | |
| 2008/0292162 A1 | 11/2008 | Gering et al. | |
| 2009/0141992 A1 | 6/2009 | Coulombe et al. | |
| 2009/0180713 A1 | 7/2009 | Bucha et al. | |
| 2010/0183242 A1 | 7/2010 | Brand | |
| 2010/0287511 A1* | 11/2010 | Meier | G06T 15/20 715/848 |
| 2010/0289817 A1* | 11/2010 | Meier | G06T 15/20 345/619 |
| 2010/0328352 A1 | 12/2010 | Shamir et al. | |
| 2011/0182502 A1 | 7/2011 | Liang | |

OTHER PUBLICATIONS

'Web-Archive' [online] "Creative Commons," 2010, [retrieved on Jan. 26, 2012]. Retrieved from Internet: <URL: http://web.archive.org/web/20100130095204/http:/creativecommons.org/>. 3 pages.

'Wikipedia' [online] "Java (programming language)," 2002, [retrieved on Jan. 27, 2012]. Retrieved from the Internet: <URL: http://en.wikipedia.org/w/index.php?title=Java_(programming_language)&oldid=550214>. 7 pages.

'Wikipedia' [online]. "OpenGL," Dec. 2004, [retrieved on Jan. 27, 2012]. Retrieved from the Internet: <URL: http://en.wikipedia.org/w/index.php?title=OpenGL&oldid=9281664>. 3 pages.

Authorized Officer Simin Baharlou, International Preliminary Report on Patentability for Application No. PCT/US2010/033771, dated Nov. 11, 2011, 7 pages.

Baker, S. and Kanade, T. "Limits on Super-Resolution and How to Break Them." IEEE Transactions on Pattern Analysis and Machine Intelligence, vol. 24, No. 9, Sep. 2002, 36 pages.

Bay et al. "SURF: Speeded Up Robust Features." Computer Vision and Image Understanding (CVIU), vol. 110, No. 3, 2008, 14 pages.

Boiman et al. "In Defense of Nearest-Neighbor Based Image Classification." Academic Paper, The Weizmann Institute of Science, Jun. 2008, 8 pages.

Chang et al. "Super-Resolution Through Neighbor Embedding." Computer Vision and Pattern Recognition, 2004. CVPR 2004. Proceedings of the 2004 IEEE Computer Society Conference, Jul. 2004, 8 pages.

Chen et al. "Sketch2Photo: Internet Image Montage." ACM Transactions on Graphics (TOG)—Proceedings of ACM SIGGRAPH Asia 2009, Dec. 2009, 10 pages.

Dale et al. "Image Restoration using Online Photo Collections." Proc. IEEE Conference on Computer Vision, Sep. 2009, 8 pages.

Eisemann et al. "Photo Zoom: High Resolution from Unordered Image Collections." SIGGRAPH 2010, Los Angeles, California, May 2010, 1 page.

HaCohen et al. "Image Upsampling via Texture Hallucination." IEEE International Conference on Computational Photography, Mar. 2010, 8 pages.

Han et al. "Multiscale Texture Synthesis." ACM Transactions on Graphics, vol. 27, No. 3, Aug. 2008, 8 pages.

Hays and Efros. "Scene Completion Using Millions of Photographs." SIGGRAPH 2007, San Diego, California, Aug. 2007, 7 pages.

Johnson et al. "CG2Real: Improving the Realism of Computer Generated Images Using a Large Collection of Photographs." IEEE Transactions on Visualization and Computer Graphics, vol. 17, No. 6, Sep. 2011, 13 pages.

Kaneva et al. "Infinite Images: Creating and Exploring a Large Photorealistic Virtual Space." Proceeding of the IEEE, vol. 98, No. 8, Aug. 2010, 17 pages.

Kirkpatrick et al. "Optimization by Simulated Annealing." Science, vol. 220, No. 4598, May 1983, 10 pages.

Liu et al. "Face Hallucination: Theory and Practice." International Journal of Computer Vision (IJCV), vol. 75, No. 1, Oct. 2007, 33 pages.

Lowe, D.G. "Object Recognition from Local Scale-Invariant Features." Computer Vision, 1999. The Proceedings of the Seventh IEEE International Conference, Kerkyra, Greece, Sep. 1999, 8 pages.

Miranda et al. "New Routes from Minimal Approximation Error to Principal Components." Neural Processing Letters, vol. 27, No. 3, Jun. 2008, 14 pages.

Pandey et al. "Nearest-Neighbor Caching for Content-Match Applications." International World Wide Web Conference Committee (IW3C2), Madrid, Spain, Apr. 2009, 10 pages.

Peterson, J. L. "Computer Programs for Detecting and Correcting Spelling Errors." Computing Practices: Communications of the ACM, vol. 23, No, 12, Dec. 1980, 12 pages.

Snavely et al. "Photo Tourism: Exploring Photo Collections in 3D." ACM Transactions on Graphics (SIGGRAPH Proceedings), vol. 25, No. 3, Jul. 2006, 12 pages.

Wang et al. "Factoring Repeated Content Within and Among Images." ACM Trans. on Graphics (SIGGRAPH), vol. 27, No. 3, Aug. 2008, 10 pages.

Webb, A. R. "Chapter 6. Nonlinear Discriminant Analysis—Projection Methods." Statistical Pattern Recognition, Jul. 2009, 22 pages.

Agarwala, A., Dontcheva, M., Agrawala, M., Drucker, S., Colburn, A., Curless, B., Salesin, D., and Cohen, M., "Interactive digital photomontage", *ACM Trans. Graph.* 23, 3, pp. 294-302, dated 2004.

Ashikhmin, M., "Synthesizing natural textures", in *I3D '01 Proceedings of the 2001 symposium on Interactive 3D graphics*, ACM, New York, NY, USA, pp. 217-226, dated 2001.

Arya, S., Mount, D., Netanyahu, N., Silverman, R., and Wu, A., "An optimal algorithm for approximate nearest neighbor searching in fixed dimensions", in *Proc. Fifth Symp. Discrete Algorithms (SODA)*, pp. 573-582, dated 1994.

Avidan, S., and Shamir, A., "Seam carving for content-aware image resizing", in *ACM Trans. Graph.* 26, 3, 10, dated 2007.

Bertalmio, M., Sapiro, G., Caselles, V., and Ballester, C., "Image inpainting", in *SIGGRAPH '00: Proceedings of the 27th annual conference on computer graphics and interactive techniques*, ACM Press/Addison-Wesley Publishing Co., New York, NY, USA, pp. 417-424, dated 2000.

Bourdev and Brandt, "Robust Object Detection Via Soft Cascade" in *Proceedings from CVPR 2005*, IEEE Computer Society, pp. 2236-2243.

Boykov, Y., Veksler, O., and Zabih, R., "Fast approximate energy minimization via graph cuts", in *Pattern Analysis and Machine Intelligence, IEEE Transactions on* 23, 11 (Nov.), pp. 1222-1239, dated 2001.

Buades, A., Coll, B., and Morel, J.M. 2005. A non-local algorithm for image denoising. In *Computer Vision and Pattern Recognition, 2005. CVPR 2005. IEEE Computer Society Conference on*, vol. 2, 60-65 vol.

Cho, T. S., Butman, M., Avidan, S., and Freeman, W., "The patch transform and its applications to image editing", in *Computer Vision and Pattern Recognition, 2008. CVPR 2008. IEEE Conference on* (June), pp. 1-8, dated 2008.

Criminisi, A., Perez, P. and Toyama, K. 2003. Object removal by exemplar-based inpainting. *Computer Vision and Pattern Recognition IEEE Computer Society Conference on* 2, 721.

Criminisi, A., Perez, P., and Toyama, K., "Region filling and object removal by exemplar-based image inpainting", in *IEEE Trans. Image Processing 13, 9 (Sep.)*, p. 1200-1212, dated 2004.

Datar, Immorlica, Indyk, and Mirrokni, "Locality-sensitive hashing scheme based on p-stable distributions", in *COMPGEOM: Annual ACM Symposium on Computational Geometry*, dated 2004.

Drori, I., Cohen-or, D., and Yeshurun, H. 2003. Fragment-based image completion. *ACM Transactions on Graphics* 22, 303-312.

Efros, A. A., and Freeman, W.T., "Image quilting for texture synthesis and transfer", in *SIGGRAPH 2001, Computer Graphics Proceedings*, ACM Press/ACM SIGGRAPH, E. Fiume, Ed., pp. 341-346, dated 2001.

Efros, A. A., and Leung, T. K., "Texture synthesis by non-parametric sampling", in *Computer Vision, IEEE International Conference on 2*, p. 1033, dated 1999.

Fischler, M.A., and Bolles, R.C. 1981. Random sample consensus: a paradigm for model fitting with applications to image analysis and automated cartography. *Commun. ACM 24*, 6, 381-395.

(56) References Cited

OTHER PUBLICATIONS

Fitzgibbon, A., Wexler, Y., and Zisserman, A. 2003. Image-based rendering using image-based priors. In *ICCV '03: Proceedings of the Ninth IEEE International Conference on Computer Vision*, IEEE Computer Society, Washington, DC, USA 1176.
Freeman, W. T., Pasztor, E. C., and Y, O. T. C., "Learning low-level vision", in *International Journal of Computer Vision 40*, dated 2000.
Freeman, W., Jones, T., and Pasztor, E. 2002. Example-based super-resolution. *Computer Graphics and Applications, IEEE 22.2* (Mar./Apr.) 56-65.
Hertzmann, A., Jacobs, C. E., Oliver, N., Curless, B., and Salesin, D., "Image analogies", in *SIGGRAPH*, pp. 327-340, dated 2001.
Komodakis, N., and Tziritas, G., 2007. Image completion using efficient belief propagation via priority scheduling and dynamic pruning *IEEE Transactions on Image Processing 16*, 11 2649-2661.
Kopf, J., Fu, C.-W., Cohen-or, D., Deussen, O., Lischinski, D., and Wong, T.-T. 2007. Solid texture synthesis from 2d exemplars *ACM Transactions on Graphics (Proceedings of SIGGRAPH 2007)* 26, 3, 2:1-2:9.
Kumar, N., Zhang, L., and Nayar, S.K., "What is a good nearest neighbors algorithm for finding similar patches in images?", in *European Conference on Computer Vision, II*: pp. 364-378, dated 2008.
Kwatra, V., Essa, I., Bobick, A., Kwatra N., "Texture optimization for example-based synthesis", in *ACM Trans. Graph.*, 24(3): pp. 795-802, dated 2005.
Kwatra V., Schdl, A., Essa, I., Turk, G., and Bobick, A., "Graphcut textures: Image and video synthesis using graph cuts", in *ACM Transactions on Graphics, SIGGRAPH 2003* 22, Jul. 3, pp. 277-286, dated 2003.
Lefebvre, S., and Hoppe, H., "Parallel controllable texture synthesis", in *ACM Trans. Graph 24, 3*, pp. 777-786, dated 2005.
Liang, L., Liu, C., Xu, Y.-Q., Guo, B., and Shum, H.-Y., "Real-time texture synthesis by patch-based sampling" in *ACM Trans. Graph. 20, 3*, pp. 127-150, dated 2001.
Liu, F. and Gleicher, M. "Automatic image retargeting with fisheye-view warping", in *UIST, ACM*, P. Baudisch, M Czerwinski and D.R. Olsen, Eds., pp. 153-162, dated 2005.
Liu, F., and Gleicher, M., "Automatic image retargeting with fisheye-view warping", in *UIST, ACM*, P. Baudisch, M. Czerwinski and D.R. Olsen, Eds., pp. 153-162, dated 2005.
Mikolajczyk, K., and Matas, J. G., "Improving descriptors for fast tree matching by optimal linear projection", in *International Conference on Computer Vision*, pp. 1-8, dated 2007.
Mount, D.M., and Arya, S., "ANN: A library for approximate nearest neighbor searching", dated Oct. 28, 1997.
Pavic, D., Schonefeld, V., and Kobbelt, L. 2006. Interactive image completion with perspective correction. *The Visual Computer 22* (September), 671-681(11).
Rong, G., and Tan, T.-S., "Jump flooding in gpu with applications to voronoi diagram and distance transform", in *I3D '06: Proceedings of the 2006 symposium on Interactive 3D graphics and games*, ACM, New York, NY, USA, pp. 109-116, dated 2006.
Rother, C., Kumar, S., Kolmogorov, V., and Blake, A., "Digital tapestry", in *IEEE Computer Vision and Pattern Recognition or CVPR, I*, pp. 589-596, dated 2005.
Rother, C., Bordeaux, L., Hamadi, Y., and Blake, A., "Autocollage", in *ACM Trans. Graph 25, 3*, pp. 847-852, dated 2006.
Rubinstein, M., Shamir, A., and Avidan, S., "Improved seam carving for video retargeting", in *ACM Transactions on Graphics (SIGGRAPH)* 27, 3, dated 2008.
Setlur, V., Takagi, S., Raskar, R., Gleicher, M., and Gooch, B., "Automatic image retargeting", in *MUM, ACM*, M Billinghurst, Ed., vol. 154 of *ACM International Conference Proceeding Series*, pp. 59-68, dated 2005.
Shiratori, T., Matsushita, Y., Tang, X., and Kang, S. B., "Video completion by motion field transfer", in *Computer Vision and Pattern Recognition, 2006 IEEE Computer Society Conference on* Jun. 1, pp. 411-418, dated Jun. 2006.
Simakov, D., Caspi, Y., Shechtman E., and Irani, M., "Summarizing visual data using bidirectional similarity", in *Proc. IEEE Conference on Computer Vision and Pattern Recognition (CVPR)*, pp. 1-8, dated 2008.
Sun, J., Yuan, L., Jia, J., and Shum, H.-Y. 2005. Image completion with structure propagation. In *SIGGRAPH '05: ACM SIGGRAPH 2005 Papers*, ACM New York, NY, USA 861-868.
Tong, X., Zhang, J., Liu, L., Wang, X., Guo, B., and Shum, H.-Y., "Synthesis of bidirectional texture functions on arbitrary surfaces", in *ACM Transactions on Graphics 21*, Jul. 3, pp. 665-672, dated Jul. 2002.
Tourapis, A. M., "Enhanced predictive zonal search for single and multiple frame motion estimation", in *VCIP, SPIE, C. C. J. Kuo, Ed.*, vol. 4671 of *Proceedings of SPIE*, pp. 1069-1079, dated 2002.
Wang, T., Mei, T., Hua, X.-S., Liu, X., and Zhou, H.-Q., "Video collage: A novel presentation of video sequence", in *ICME, IEEE*, pp. 1479-1482, dated 2007.
Wang, Y.-S., Tai, C.-L., Sorkine, O., and Lee, T.-Y. 2008. Optimized scale-and-stretch for image resizing. In *SIGGRAPH Asia '08:ACM SIGGRAPH Asia 2008 papers*, ACM, New York, NY, USA 1-8.
Wei, L. Y., and Levoy, M., "Fast texture synthesis using tree-structured vector quantization", in *SIGGraph-00*, pp. 479-488, dated 2000.
Wei, L.-Y., Han, J., Zhou, K., Bao, H., Guo, B., and Shum, H.-Y., "Inverse texture synthesis", in *ACM Trans. Graph 27, 3*, pp. 1-9, dated 2008.
Wexler, Y., Shechtman, E., and Irani, M., "Space-time video completion", in *Computer Vision and Pattern Recognition, IEEE Computer Society Conference on 1*, pp. 120-127, dated 2004.
Wexler, Y., Shechtman, E., and Irani, M., "Space-time completion of video", in *IEEE Trans. Pattern Analysis and Machine Intelligence 29, 3*, (Mar.), pp. 463-476, dated Mar. 2007.
Wolf, L., Guttmann, M., and Cohen-or, D. 2007. Non-homogeneous content-driven video-retargeting. In *Proceedings of the Eleventh IEEE International Conference on Computer Vision (ICCV-07)*.
Yianilos, P.N., "Data structures and algorithms for nearest neighbor search in general metric spaces", in *SODA*, pp. 311-321, dated 1993.
"AutoCollage" [online] Microsoft Research 2008, [retrieved on Nov. 26, 2008]. Retrieved from he Internet: <URL: http://research.microsoft.com/autocollage/>.
Barnes, et al., "Supplementary Material for the Generalized PatchMatch Correspondence Algorithm", Downloaded from the internet at http://www.cs.princeton.edu/gfx/pubs/Barnes_2010_TGP/index.php on Sep. 9, 2010, 6 pages.
Barnes, et al., "The Generalized PatchMatch Correspondence Algorithm", Downloaded from the internet at http://www.cs.princeton.edu/gfx/pubs/Barnes_2010_TGP/index.php on Sep. 9, 2010, 14 pages.
Lin, et al. "Random Forests and Adaptive Nearest Neighbors", Technical Report No. 1055, Downloaded from the internet on Sep. 7, 2010 at www.stat.wise.edu/Department/techreports/tr1081.pdf; May 29, 2002, 31 pages.

\* cited by examiner

400A

400B

400C

GENERATING A MODIFIED IMAGE WITH ADDITIONAL CONTENT PROVIDED FOR A REGION THEREOF

RELATED APPLICATIONS

This application is a utility patent application and claims priority to U.S. Provisional Application Ser. No. 61/215,465, filed May 6, 2009, entitled "GENERATING A MODIFIED IMAGE WITH ADDITIONAL CONTENT PROVIDED FOR A REGION THEREFOR," the entire contents of which are incorporated herein by reference.

BACKGROUND

This specification relates to digital image processing.

Some existing image processing techniques use patch-based techniques for manipulating content. The processing can involve analyzing or synthesizing patches (e.g., pixel groups) of image content. For example, patch-based approaches are used in denoising image and video content; enhancing image resolution such as performing super-resolution; compressing image content; changing image aspect ratio such as by retargeting; reshuffling of image content; stitching images together; editing image content; and performing texture synthesis. Patch-based methods can have benefits for synthesis operations. For example, structure, texture, repetitive patterns and redundancies can be treated.

Techniques have been tried for completing images in different ways, and they can rely on patch-based techniques. For example, hole-filling techniques exist that attempt to find content for a hole in an image by analyzing content elsewhere in the image. Cloning techniques exist where a user manually can select a source region which is then cloned to a target region to fill the hole.

SUMMARY

The invention relates to image modification using semantic information provided by a user.

In a first aspect, a computer-implemented method for generating a modified image includes displaying an image in a computer system. The image includes contents that have a feature visible therein, the contents having a region thereof defined to be provided with additional content in generating a modified image. The method includes receiving an input comprising a semantic mark to be placed on the image, the semantic mark indicating an inside-region part inside the region and an outside-region part outside the region. The method includes determining the additional content for the region using a patch-based optimization algorithm applied to the image, the patch-based optimization algorithm (i) identifying the additional content for the inside-region part based on the outside-region part and not on an area of the image that the semantic mark does not indicate, and (ii) identifying the additional content for a remainder of the region without being restricted to the outside-region part. The method includes storing the modified image having the additional content in the region.

Implementations can include any or all of the following features. The region can include a hole in the image without the contents and the modified image can be generated in a hole-filling process. The hole can be filled such that the feature extends into the region that previously did not contain the contents. The image can be a photograph and the feature a physical object, and the region can be defined corresponding to a structure of the physical object that is missing in the feature. The semantic mark can be made using at least one of: a line tool, an arc tool, a brush tool, an area-selection tool, and combinations thereof. A part of the semantic mark can be placed inside the region to indicate the inside-region part, and another part of the semantic mark can be placed outside the region to indicate the outside-region part. An identifying characteristic can be assigned to the semantic mark, the identifying characteristic distinguishing the semantic mark from at least one other semantic mark in the image such that the patch-based optimization algorithm processes the semantic marks separately. The semantic marks can cross each other and the patch-based optimization algorithm can process the semantic marks separately. The method can further include receiving another input that defines an additional semantic constraint for the patch-based optimization process. The additional constraint can include at least one of: a first search-space restriction defined for a coherence aspect of the patch-based optimization algorithm, the first search-space restriction excluding at least a first area of the image from being used in the additional content; and a second search-space restriction defined for a completeness aspect of the patch-based optimization algorithm, the second search-space restriction requiring the additional content to be complete with regard to a second area of the image indicated by the second search-space restriction. The outside-region part can be located in another image separate from the image having the region.

A method can be implemented using a computer program product tangibly embodied in a tangible program carrier and including instructions that when executed by a processor perform a method.

In a second aspect, a graphical user interface includes an image display area displaying an image in a computer system, the image comprising contents that have a feature visible therein, the contents having a region thereof defined to be provided with additional content in generating a modified image. The graphical user interface includes an input control for receiving an input comprising a semantic mark to be placed on the image, the semantic mark indicating an inside-region part inside the region and an outside-region part outside the region. The additional content for the region is determined using a patch-based optimization algorithm applied to the image, the patch-based optimization algorithm (i) identifying the additional content for the inside-region part based on the outside-region part and not on an area of the image that the semantic mark does not indicate, and (ii) identifying the additional content for a remainder of the region without being restricted to the outside-region part, and the modified image having the additional content in the region is stored.

Implementations can include any or all of the following features. The region can include a hole in the image without the contents and the modified image can be generated in a hole-filling process. The image can be a photograph and the feature a physical object, and the region can be defined corresponding to a structure of the physical object that is missing in the feature. The input control can include at least one of: a line tool, an arc tool, a brush tool, an area-selection tool, and combinations thereof. The input control can associate an identifying characteristic with the semantic mark, the identifying characteristic distinguishing the semantic mark from at least one other semantic mark in the image such that the patch-based optimization algorithm processes the semantic marks separately.

A graphical user interface can be implemented using a computer program product tangibly embodied in a computer-readable storage medium, the computer program product including instructions that, when executed, generate on a display device a graphical user interface.

In a third aspect, a system includes a display device displaying an image, the image comprising contents that have a feature visible therein, the contents having a region thereof defined to be provided with additional content in generating a modified image. The system includes an input device for receiving an input comprising a semantic mark to be placed on the image that indicates at least part of the feature, the semantic mark crossing a border of the region such that an inside-region part and an outside-region part of the semantic mark are formed. The system includes an image editor component determining the additional content for the region using a patch-based optimization algorithm applied to the image, the patch-based optimization algorithm identifying (i) the additional content for the inside-region part based on the outside-region part and not on an area of the image that the semantic mark does not indicate, and (ii) the additional content for a remainder of the region without being restricted to the outside-region part.

Implementations can include any or all of the following features. The input device can include at least one of: a line tool, an arc tool, a brush tool, an area-selection tool, and combinations thereof. The input device can associate an identifying characteristic with the semantic mark, the identifying characteristic distinguishing the semantic mark from at least one other semantic mark in the image such that the patch-based optimization algorithm processes the semantic marks separately.

Particular embodiments of the subject matter described in this specification can be implemented to realize one or more of the following advantages. Image editing can be improved. Semantics in source images can be preserved by a user making inputs to mark one or more features in the images. A user can mark a feature that extends into a hole or other image region to be completed, and the mark can be used in selecting content to fill in content that matches the feature.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Figure 1:
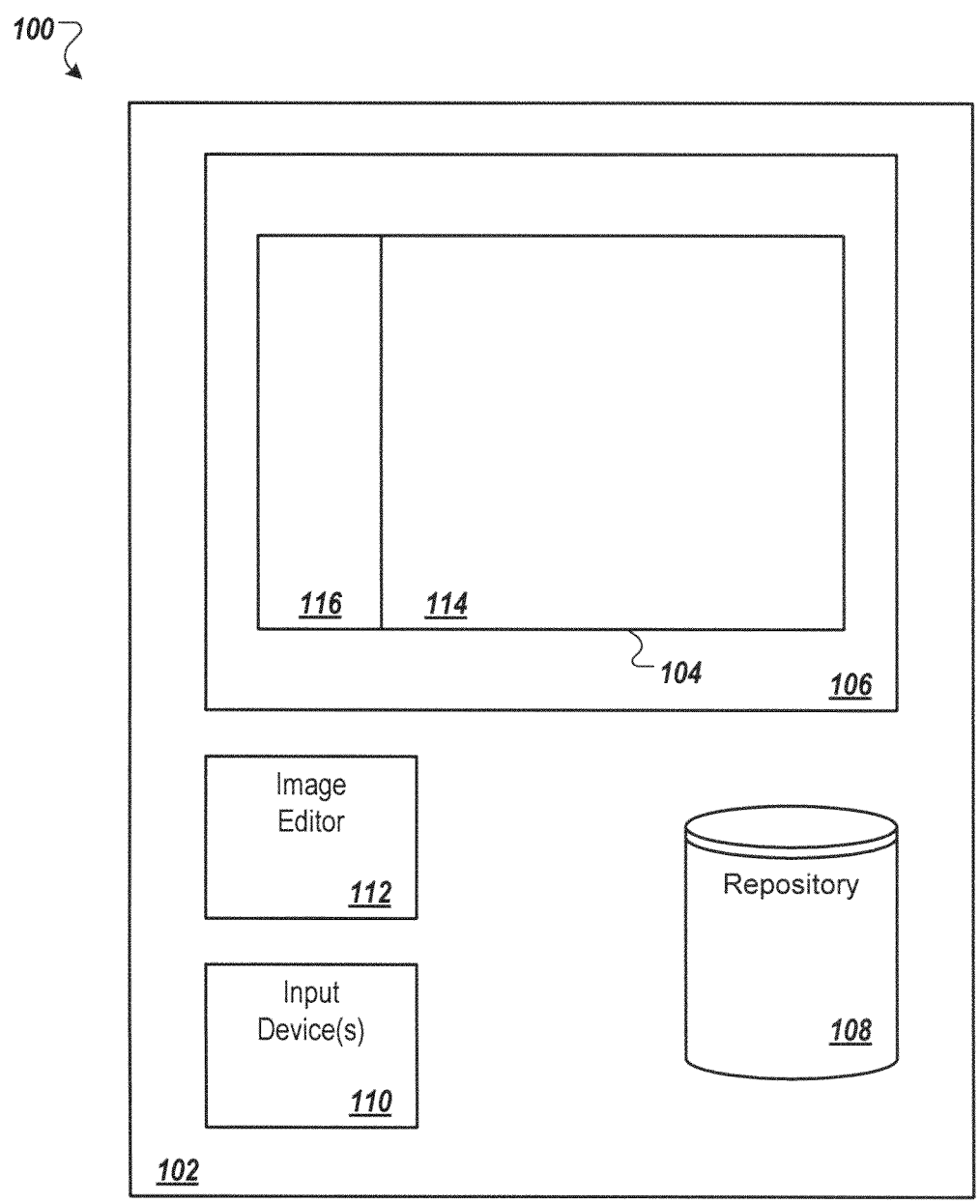
FIG. 1 shows an example system that can generate a modified image.

FIG. 1 shows an example system 100 that can generate a modified image. The system 100 includes a computer device 102, which can be any processor-based device including, but not limited to, a personal computer, a server device, a workstation or a handheld device.

The system 100 includes a graphical user interface (GUI) 104 that here is generated by the computer device 102. For example, the GUI 104 can be displayed on a display device 106 connected to the computer device. The GUI 104 is used in the manipulation if images, such as to show a user an initial image and/or a modified image.

The system 100 includes at least one repository 108, which can be implemented using any technology suitable for storing data, such as in form of a memory, a hard drive, or an optical disk, to name a few examples. The repository 108 can contain one or more images, for example images that have not been modified and/or modified images. The system 100 can make one or more images in the repository 108 available to a user, for example by displaying the image(s) in the GUI 104.

The system 100 includes at least one input device 110, such as a keyboard, mouse, pointing device, trackball, joystick, track pad, or any other device with which a user can control and/or respond to the computer device 102. The user can make an input to affect image processing, such as to apply one or more constraints for the modification.

The system 100 can be used for any of a number of purposes, such as for modifying an image by performing hole-filling in an image, which will be used as an illustrative example below. Other applications include, but are not limited to, modifying a photograph to add image content corresponding to structure that is missing in the physical object that is the subject of the photograph. Generally, the modification involves adding information in an area of the initial image selected from another area of the image. Here, these and other operations are performed by an image editor component 112 that can be implemented using processor-executed instructions stored in a computer readable storage device, such as in a memory or on a disk. The image editor component 112 can generate output for display in the GUI 104, such as an image display area 114 and an input control area 116.

An image modification process can be performed using patch-based optimization subject to at least a coherence criterion. A patch-based optimization algorithm is described in WEXLER, Y, SHECHTMAN, E., AND IRANI, M., Space-time completion of video, IEEE Trans. PAMI Vol. 29, No. 3 (March 2007), 463-476, the entire contents of which are incorporated herein by reference. Here, a patch-based optimization algorithm that takes into account a user-defined semantic constraint can include:

The modified image can be initialized with a smooth interpolation of the missing region boundary.

A multi-scale algorithm can be initiated where a hole in the source image is first filled using a coarsest scale and then interpolated to finer scales in iterations. For example, a Gaussian pyramid can be used where the finest scale corresponds to the scale of the source image.

The nearest-neighbor process using iteratively repeated steps of propagation and random search can be performed under at least one user-specified constraint.

Color votes can be assigned to each pixel according to the nearest neighbors of all its overlapping patches.

The color votes can be averaged, or clustered and the largest cluster or mode can be chosen, to obtain a new color.

The previous three steps above can be repeated to improve the results for a fix number of iterations, or until the image changes less than a predefined amount, or based on another termination criterion.

The previous four steps can be repeated as part of the multi-scale algorithm.

Nearest-neighbor techniques can be used in the patch-based optimization. For example, a nearest-neighbor process can be applied to a patch in the initial image (e.g., to a predetermined number of pixels such as a 5×5 pixel patch). A nearest neighbor field can be determined that maps each patch coordinate in the initial image to a two-dimensional offset space. The offset represents the adjustment in patch coordinates between the patch in the initial image and the corresponding patch in the modified image. For example, an initial patch a in the initial image has a nearest-neighbor patch b in the modified image. The nearest-neighbor field f is then defined as $$f(a)=b-a$$

The offset values of the nearest-neighbor field can be stored in an array. For example, the array can have the same dimensions as the initial image.

The patch-based optimization begins with an initial set of offsets. Next, an iterative update based on the initial offsets is applied to the nearest-neighbor field. In each iteration, good patch offsets are propagated to neighboring patches, and a random search is performed in the neighborhood of the best offset.

The initial offsets can be generated by randomly assigning values to the offset field, or by using prior information. In a hierarchical refinement process using image pyramids, an initial guess from a previous level can be available for use at the present level. If the final image resolution has not been reached, rescaling the current solution estimate to the next higher resolution in the image pyramid and repeating the previous four steps as part of the multi-scale algorithm. For example, a few iterations of the algorithm can be performed based on a random initialization, and this can then be merged with the available initial guess before remaining iterations are performed.

In the iterative process, patch offsets can be examined in scan order throughout the offset array. Each iteration includes a propagation step and a random-search step. In the propagation step, assume that a mapping f(x,y) is being examined. The nearby mappings f(x−1,y) and f(x,y−1) will be used to improve the mapping f(xy). For example, if f(x−1,y) is a good mapping the process will attempt to use it for (x, y). In some iterations, such as in every other one, the offsets can be examined in reverse order so that information about offset/mapping quality is propagated in an opposite direction.

Mappings can be evaluated using a patch distance function. Any distance function can be used. Some implementations can use common distance functions for natural images and/or other data sources including video and three-dimensional shapes, such as an $L_p$, $L_1$, or clamped $L_2$, etc., or any other scalar function. In some implementations, the patch distance function D is selected such that the optimal offsets for neighboring overlapping patches have a high probability of being similar. The higher this probability, the faster the algorithm converges.

In the random-search step, the process attempts to improve a mapping f(x,y) by randomly searching within the modified image for a better mapping (i.e., for a target patch whose distance metric to the source patch is lower). In some implementations, patches at successively decreasing distance from the target patch can be evaluated. For example, a uniform random selection of direction chosen in the field [−1,1]×[−1,1] is selected, and an exponential function is used to decrease the distance from a maximum pixel radius w. If a better mapping is found in the random search, it is substituted for the current mapping.

The iterations are halted when a criterion is met. In some implementations, the criterion is whether the fraction of modified offsets falls below a threshold. In some implementations, a fixed number of iterations is used, for example five. Performing the patch-based optimization generates the modified image so that it corresponds to the initial image. For example, the modified image can be a version of the initial image where an image hole has been filled, or where content has been selectively added to a feature. The intermediate image generated as described above will be an improved estimate over the initial guess, but may not satisfactorily solve the image completion problem. The entire process is therefore repeated iteratively, using the iterative offset optimization in the inner loop, to compute a high quality final solution.

In some implementations, a bidirectional similarity measure can be used, for example one that finds good correspondences between image regions in both directions (e.g., from a patch in the initial image to a patch in the modified image, and vice versa). For example, if the image regions are sufficiently similar, an existing bi-directional similarity method can converge to a partially continuous solution, with many salient regions copied to the output with minimal distortions. For example, most offsets of nearby patches in the source image may be nearly identical. As another example, if the image regions are not particularly similar, then the true bi-directional similarity may likely be close to a similarity of random patches within the images.

In some implementations, the bidirectional similarity algorithm can include at least the following operations. In a coherence step, the algorithm seeks a nearest-neighbor patch outside the hole for every patch inside the hole. In a completeness step the algorithm seeks a nearest-neighbor patch inside the hole for every patch outside the hole. These searches generate nearest-neighbor votes in both directions between the source and target images. The votes are used to compute the color of each pixel inside the hole (for example, by averaging or clustering) in each inner loop iteration. In the context of user-defined constraints, the completeness term can be used to define a region that the user wishes to be included inside the hole, so that the hole is complete with regard to the user-defined region, but the user does not specify exactly where inside the hole the algorithm will place the region.

A patch-based optimization algorithm can use a coherence criterion that relates to whether all patches in the modified image originate from the initial image. That is, the image editor component 112 can seek to ensure with regard to the target image that every patch used to fill a hole therein is one that exists somewhere in the source image, so that the target image is coherent with the source image. For example, each patch in the modified image should have at least one corresponding patch in the initial image. In contrast, if a patch in the modified image lacks any corresponding patch in the initial image then the coherence criterion is not satisfied. Coherence in the modified image can be obtained by processing at multiple scales so that eventually local coherence at multiple scales gives a globally coherent and natural-looking output in the target image.

Bidirectional-similarity calculations use a completeness term in addition to the coherence term. A completeness term can be used in the algorithm for a fill-in application or in combination with completion retargeting and/or reshuffling, to name two examples. In some implementations, a user can mark a hole in an image, add one or more search space constraints, specify that the output size will be smaller (i.e., retargeting) and specify that some other regions will move around (i.e., reshuffling) and then the system can run these together to synthesize the output.

For example, the completeness term can seek to ensure that all content from the source image exists somewhere in the target image. A completeness criterion relates to whether all patches in the initial image are represented in the modified image. For example, if the initial image contains multiple identical patches, the completeness criterion specifies that at least one of the patches should be found in the modified image. In contrast, if a unique patch in the initial image lacks any corresponding patch in the modified image then the completeness criterion is not satisfied.

A nearest-neighbor algorithm can be performed iteratively in an inner loop of a bidirectional or unidirectional similarity algorithm, for example to perform retargeting.

Examples of bidirectional similarity calculations are described in SIMAKOV, D., CASPI, Y., SHECHTMAN, E., and IRANI, M. 2008, Summarizing visual data using bidirectional similarity. In Computer Vision and Pattern Recognition, CVPR 2008. IEEE Conference.

Figure 2:
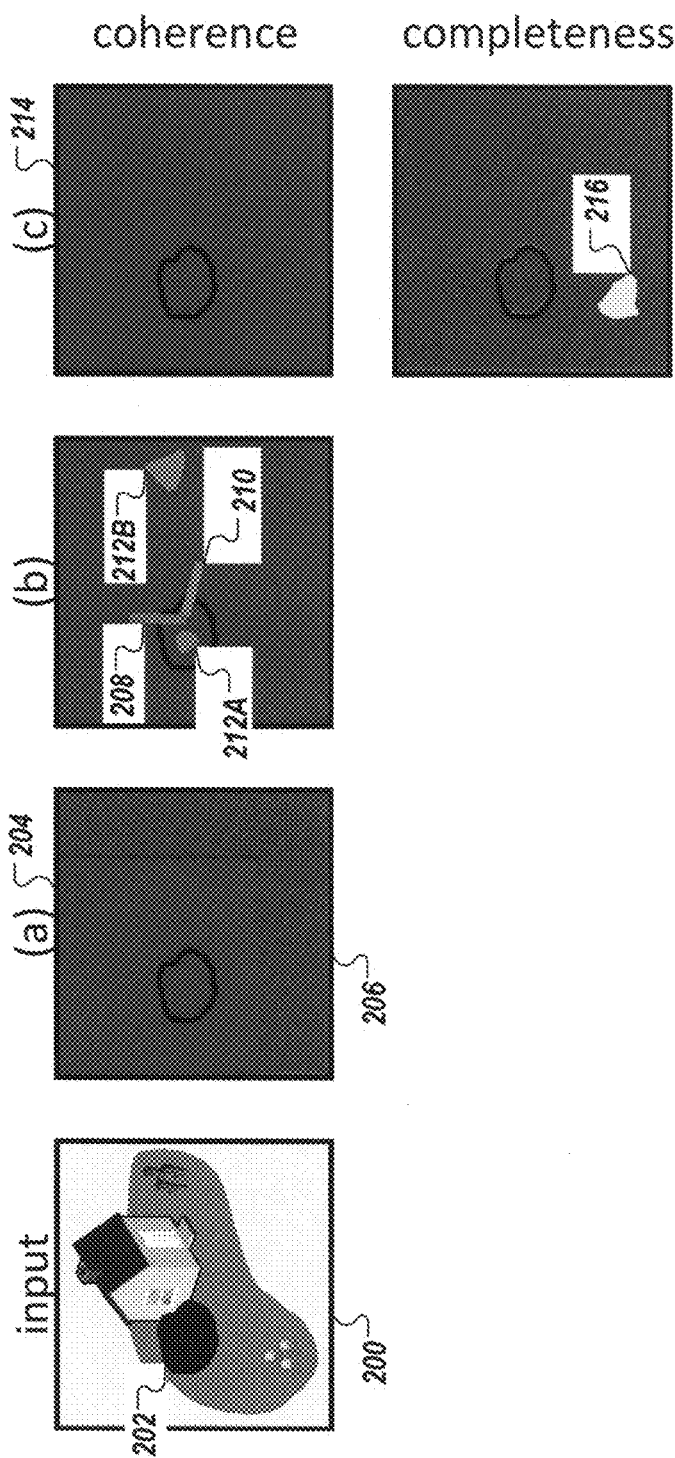
FIG. 2 schematically shows an example of constraints for image modifications.

FIG. 2 schematically shows an example of constraints for image modifications. Here, an image 200 is an initial image that shows a piece of land with a building on it. The image 200 includes a hole 202 that presently lacks image content. A modification process is to be performed on the image 200 that creates a convincing appearance instead of the hole 202.

Three examples of scenarios are illustrated and labeled (a), (b) and (c). Scenarios (a) and (b) deal exclusively with a coherence term in the similarity algorithm. This is indicated by the name "coherence" for the row where these examples are shown. That is, scenarios (a) and (b) focus on ensuring that the content ultimately placed in the hole 202 should exist in the FIG. 200.

Scenario (a) relates to a limitation of the search space. That is, an area 204 which is indicated by blue color in this example will be the search space for finding the patches to fill the hole 202. By contrast, an area 206 which is indicated by dark gray in this example will not be used as search space for the hole filling procedure. The user can narrow the search space to the area 204 for one or more reasons. For example, note that the image 200 includes yellow and red flowers on the ground by the house. Assume that the user does not want flowers to be included in the hole 202. Therefore, the user can define the area 204 so that it does not include the flowers but includes the rest of the image 200. Thus, it is ensured that the filled hole is coherent with regard to the image 200 while the flowers are not included in the hole.

The user can make the definition using any tool, such as by marking the area 204 and/or 206 when the image 200 is displayed in the system 100 (FIG. 1). Any other shape of the area 204 and/or the area 206 can be used.

Scenario (b) relates to multiple-index search space constraints. Here, the user places semantic marks 208 and 210 across the boundary of the hole, and a pair of semantic marks 212 such that one part 212A thereof is inside the hole and another part 212B is outside the hole. The significance of the semantic marks is that the portion of, say, the mark 208 that is inside the hole will be filled based on searching only the area indicated by the portion of the mark 208 that is outside the hole. One way of interpreting such semantic image completion is that it allows the user to semantically indicate what feature(s) near the hole boundary should be extended into the hole in the completion process. For example, the user may desire that the corner of the house in the image 200 continue vertically down into the hole 202. Therefore, the user can indicate at least a part of the corner with the mark 208. This ensures that image information for the corner is used as the search space for the part of the hole indicated by the mark 208, and moreover prevents information from elsewhere in the image 200, such as from the roof or the flowers, from being used in filling that portion of the hole. Similarly, the user can place the mark 210 to indicate that the foundation baseline of the house extends into the hole.

The pair of semantic marks 212 also relate to defining the sear space for a portion of the hole. Particularly, the part 212A indicates an area of the hole and the part 212B defines the search space to be used for the area indicated by the part 212A. That is, the marks 212 can allow the user to specify that a particular feature outside the hole 202, such as a group of flowers, should be the search space for a specific area inside the hole.

In some implementations, the mark 212B can be placed in another image that is separate from the image having the hole. This means that the search space for filling a part of a hole can include also content outside the image being modified. For example, assume that similar images of a person exist, and in one of them the person's eyes are closed. The user can then mark one or both eyes as a hole, add a mark inside the hole to indicate where content is to be placed, and associate the semantic mark with eyes in another image that are open.

For a remainder of the hole 202 that is not indicated by any of the marks 208-12, the algorithm uses the entire image 200 as the search space. That is, an area inside the hole without semantic marking is not restricted to only a particular semantic search space.

In scenario (c), a completeness aspect is also taken into account, as indicated by that label on the lower row. That is, the algorithm ensures not only that the filled hole is coherent with regard to the image 200, but also that the hole is complete with regard to at least a portion of the image 200. This corresponds to performing a bidirectional similarity algorithm while taking into account one or more user-defined semantic constraints.

First, the user in this example does not limit the search space for the coherence aspect, as indicated by an area 214 which here is colored blue and covers the entire image 200. That is, the algorithm will ensure that all the contents that are placed inside the hole can be found somewhere in the image 200.

Second, the user wishes to ensure that the yellow flowers in the image 200 are included in the hole when it is filled with image content. One option for the user might be to employ a semantic mark such as the pair 212, with one part inside the hole and one part indicating the yellow flowers. That would require the user to specify the exact location inside the hole, in analogy with how the part 212A was placed in scenario (b). Here, however, the user indicates the yellow flowers with a semantic completeness mark 216. The mark 216 instructs the algorithm that the hole should be made complete with regard to the portion of the image 200 indicated by the mark. That is, the algorithm will ensure that all of the contents indicated by the mark 216 will be found somewhere inside the hole when it has been filled with content. Thus, the user can selectively apply a semantic completeness constraint to an image modification process. Had the user marked the entire image 200 with the mark 216, as opposed to just the yellow flowers, this would have required the algorithm to place all the contents of the image 200 inside the hole.

Combinations of scenarios (a), (b) and (c) can be used. For example, the mark 208 can be used in combination with the search space limitation of scenario (a). As another example, at least one coherence and completeness constraint can be applied in the same image modification process.

In some implementations, two or more semantic marks can overlap. For example, if a patch inside the hole is indicated by two or more semantic marks (e.g., the patch has two indices/ colors associated with it) the patch should be searched for in all the regions indicated by the marks.

Figure 3A:
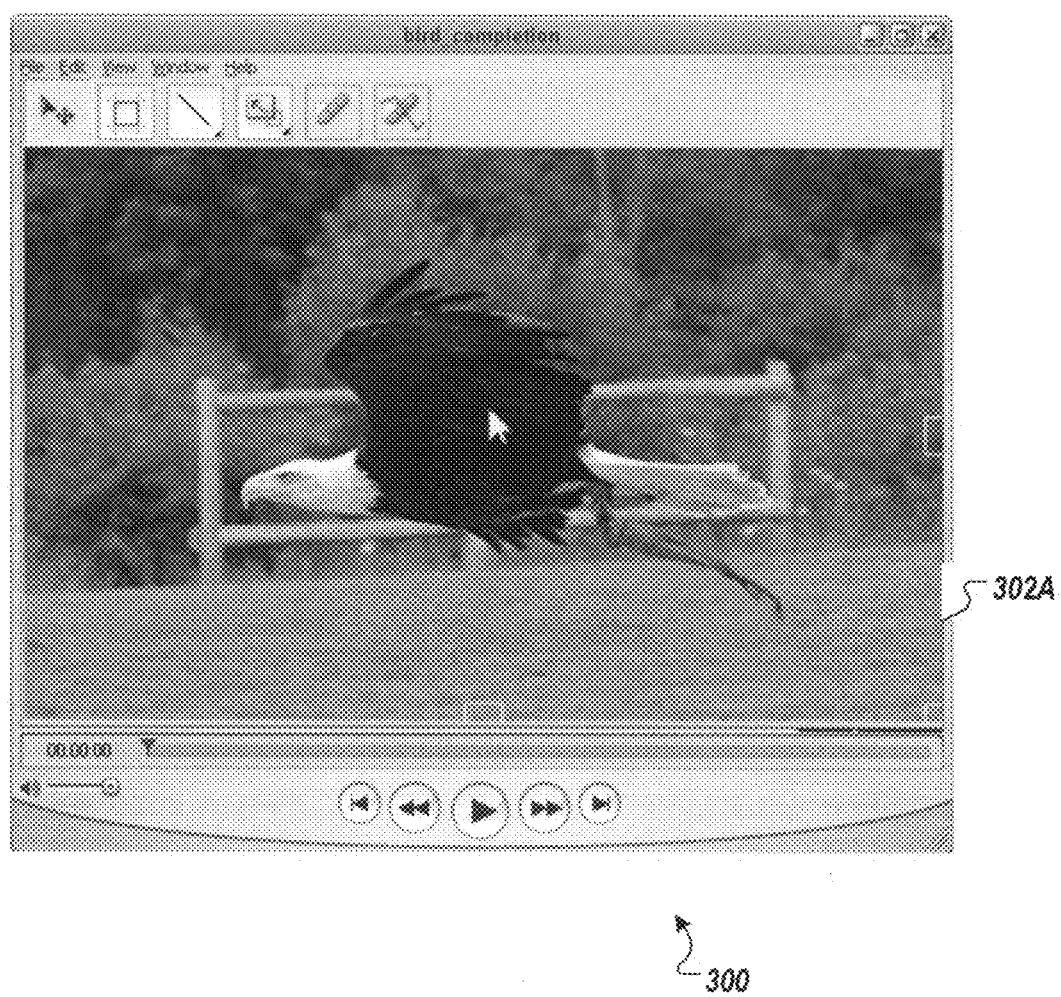
FIGS. 3A-G show another example of image modifications.

FIGS. 3A-G show another example of image modifications. This example describes in more detail how missing image content for a structure in the subject of a photograph can be provided with guidance from a user. In FIG. 3A, a tool 300 is shown. For example, the tool 300 can be generated by the image editor component 112 and its output can be presented in the GUI 104 (FIG. 1). Image 300A shows an eagle flying in front of a background that includes a wooden fence. The modification to be performed here is to remove the eagle and create a natural-looking image of the fence and the surrounding foliage.

Figure 3B:
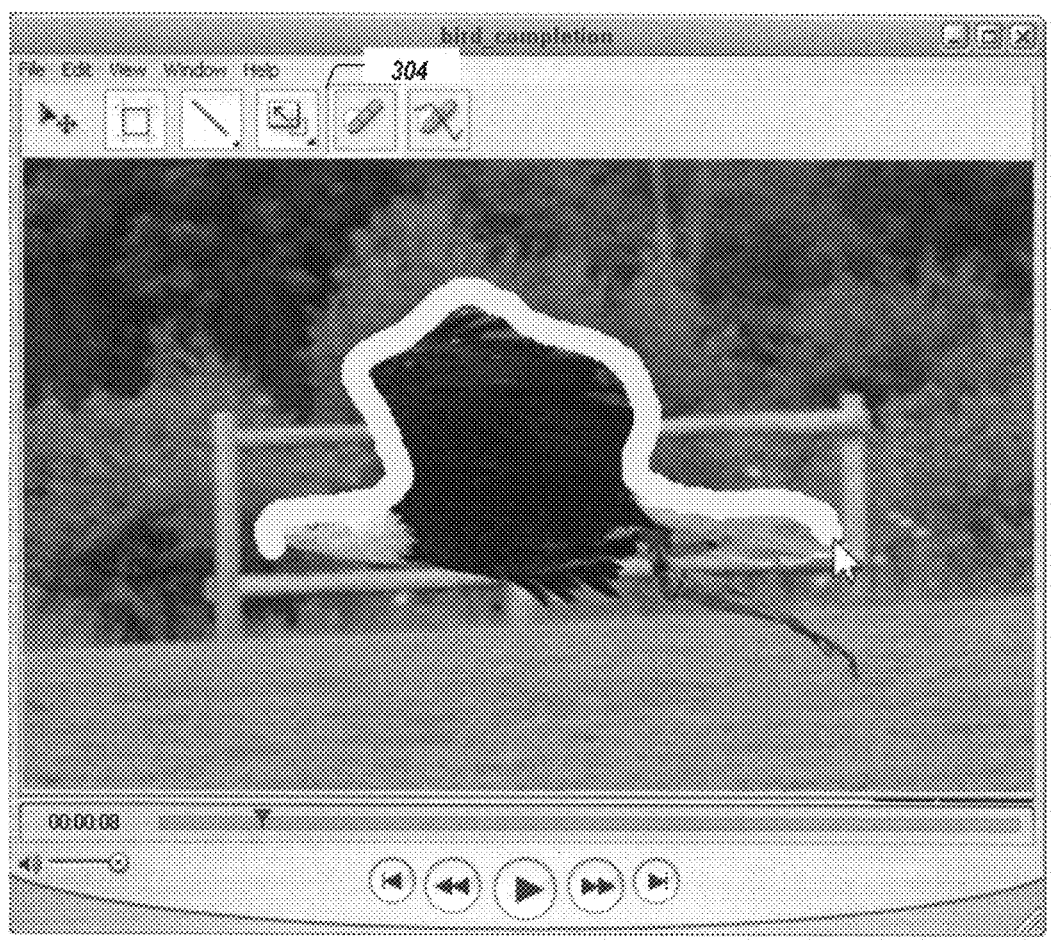

FIG. 3B shows that the user can use a control 304 to indicate the image content to be removed. Here, the control 304 is a drawing tool and the user has begun tracing around the edges of the eagle. Any kind of tool can be used for the marking, such as a lasso tool or a color-sensitive tool. The tool is generated by the image editor component 112 and is presented in the input control area 116.

Figure 3C:
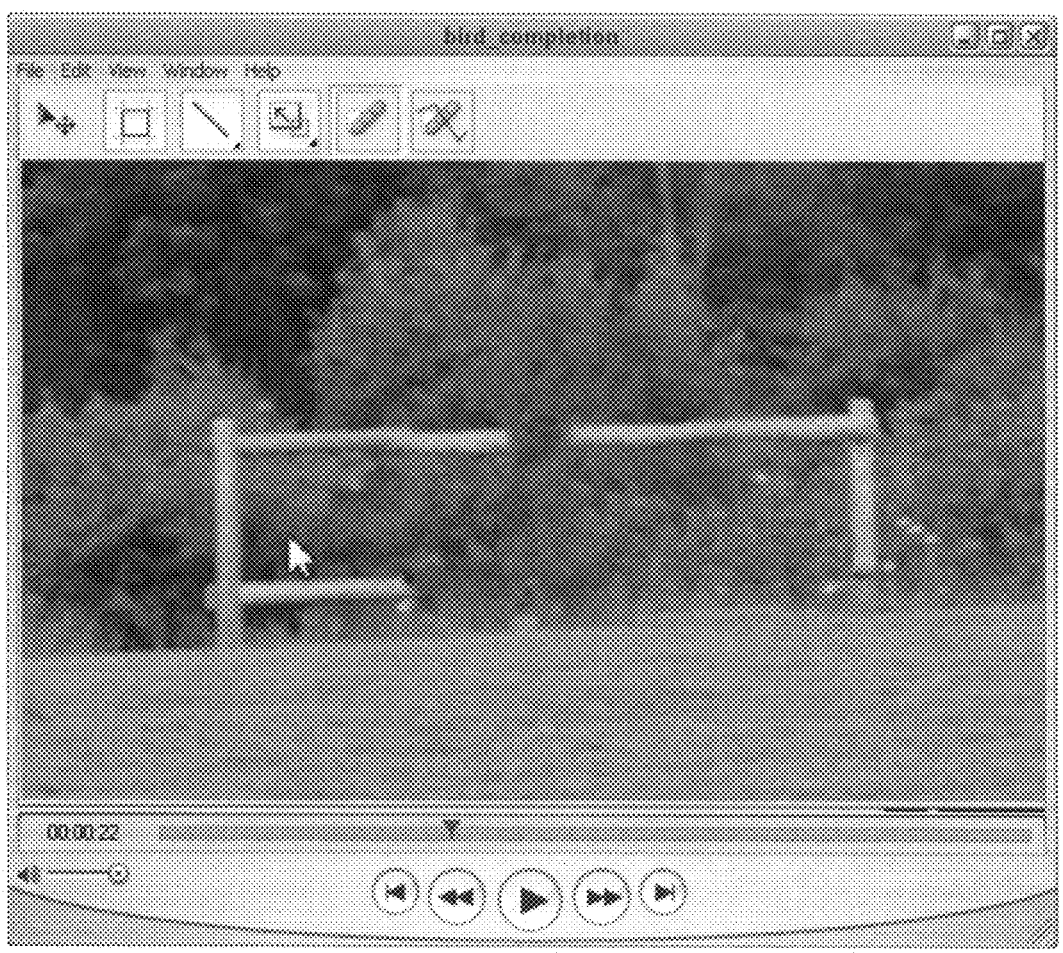

FIG. 3C shows that the eagle has been removed from the image. Initially, a hole remains in the image where the eagle previously was visible. In some implementations, a preliminary hole-filling technique can be applied in an attempt to eliminate the hole and complete the image. Here, for example, the preliminary hole-filling technique has managed to fill in foliage contents in areas that were previously occupied by the eagle image, but the fence is lacking portions of the upper and lower bars and almost the entire middle post. This occurs because semantic information regarding the bars and the post was not available to aid the hole-filling technique at that point.

Figure 3D:

In FIG. 3D, however, the user activates a tool 306 that allows semantic information to be entered by marking important features in the image. The tool 306 includes a menu 308 where the user can choose between options for marking a number of separate semantic features. Here, the options are labeled as colors (red through black) and the user now chooses the red option. Any kind of input control can be included in the tool 306, such as, but not limited to, a line tool, an arc tool, a brush tool, an area-selection tool, and combinations thereof.

Figure 3E:
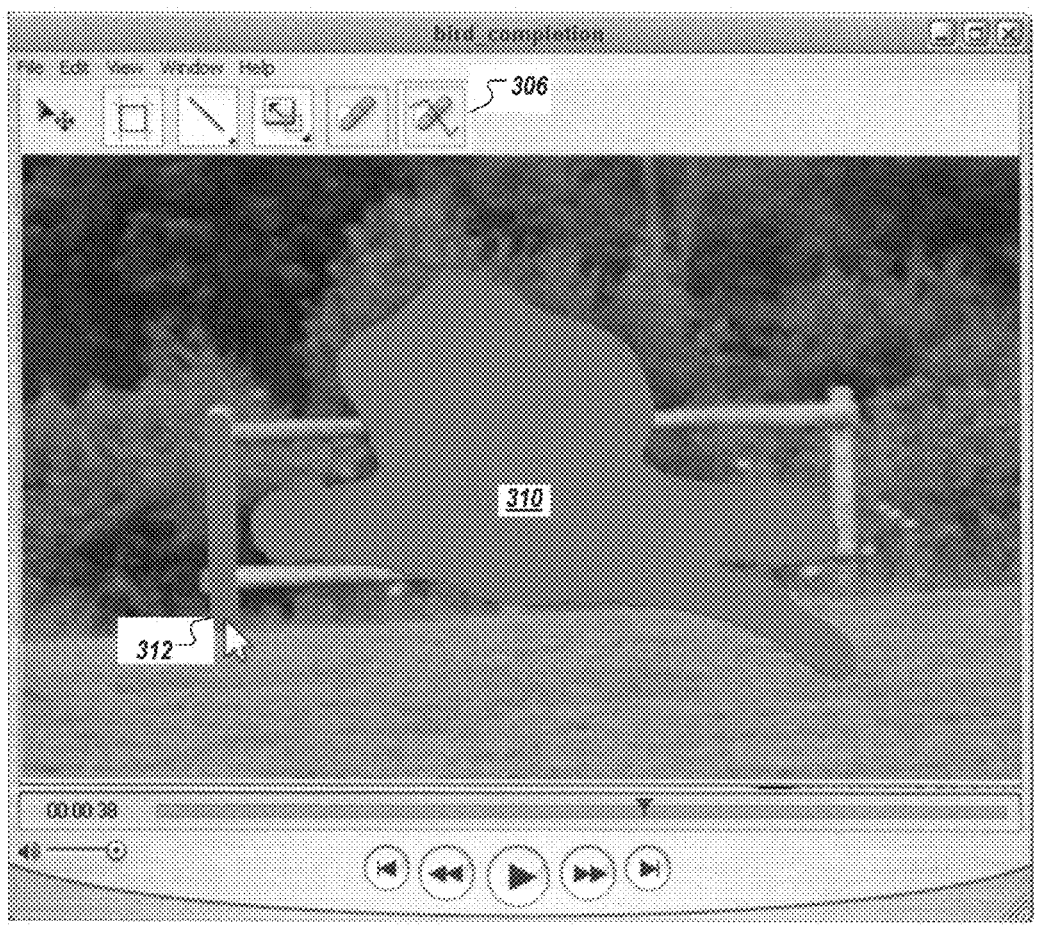

In FIG. 3E, the user begins marking with the tool 306. First, it is noted that a hole 310 from removing the eagle is now displayed. The information about the hole's shape and location can be preserved while the preliminary hole-filling technique is applied. For example, showing the hole 310 can aid the user in performing the proper markings on the image. Here, the user draws a line 312 using the tool 306. The user draws the line 312 so that it essentially coincides with the fencepost that is not affected by the hole 310. The line 312 is here displayed using red color because the user chose "Red" in the menu.

Figure 3F:
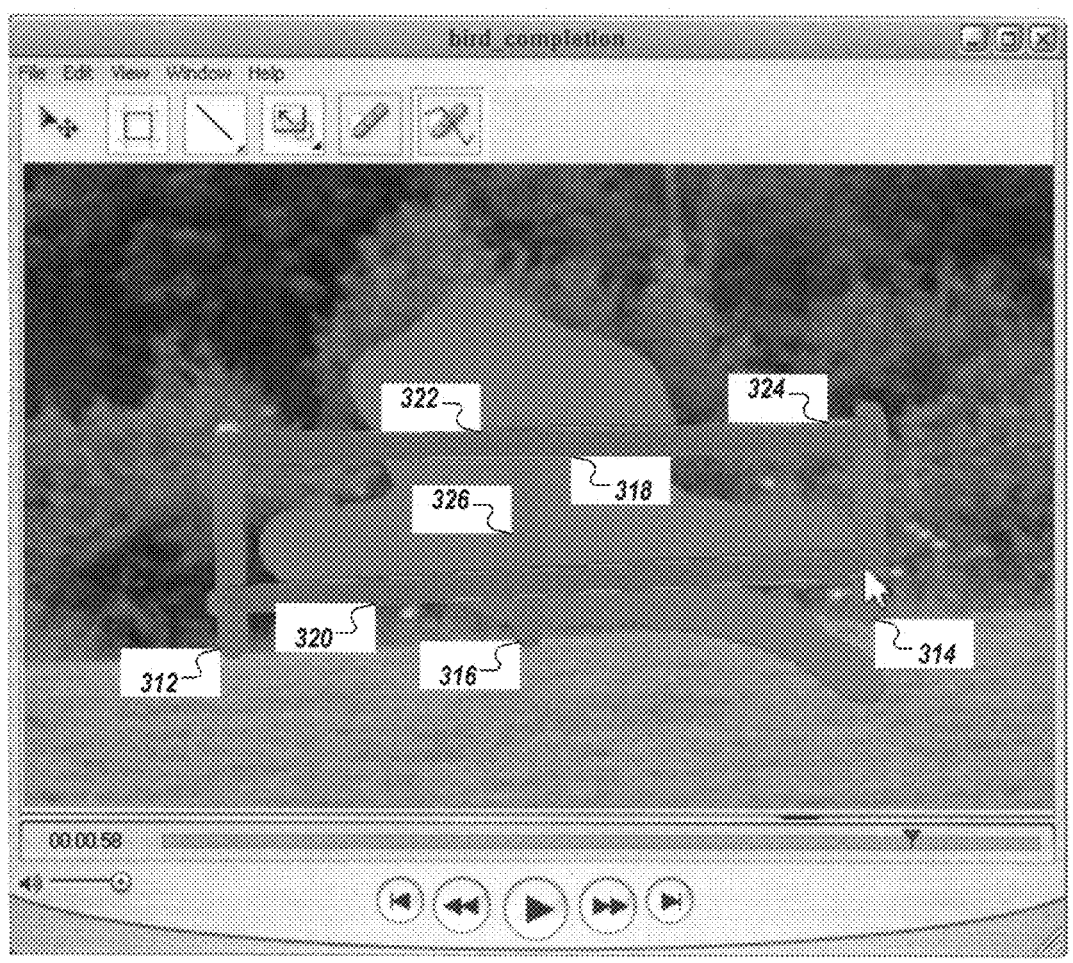

FIG. 3F shows that the user can enter one or more additional marks in the image, using the same or a different marking tool. Here, another fencepost has been marked with a line 314, and the center fencepost, of which only a small amount remained after removing the eagle, has been marked using a line 316. The lines 312, 314 and 316 are all red because they were made with the same marking tool labeled with that color. Similarly, another marking tool (here labeled green) is used to mark the upper and lower bars with lines 318 and 320, respectively. Thus, the user has marked features of interest (e.g., the fenceposts and bars) and labeled them differently so that they are handled separately.

Based on the marked areas, the image completion is then carried out. Particularly, the hole from the eagle is filled using the information that the user has provided. Here, for example, the bar 318 has an inside-region part 322 and an outside-region part 324. That is, the inside-region part 322 is the part of the line 318 that is inside the hole and the outside-region part 324 is the part of the line 318 that is outside the hole. When seeking image content to fill the inside-region part 322 (e.g., patches that can be applied at those locations to fill the hole), the system will look only to the outside-region part 324 and to any other areas marked with the same tool. Here, that includes the line 320 because it too is green. In contrast, the remainder of the image that was not marked with the green tool, such as the background foliage and the fenceposts, will not be used in filling the inside-region part 322. The parts of the line 320 that cross through the hole will be filled based on the same information.

Similarly, the line 316 has an inside-region part 326 that will be filled based on the portions marked with the red tool that are outside the hole, without referring to any area that is not marked with the red tool. Here, the line 312 is entirely outside the hole and therefore will act as a source of information for the hole filling. The line 316, in contrast, will be subject to hole filling for most of its length except for a remaining piece outside the hole at its lower end.

The image editor tool 110 (FIG. 1) can allow markings from tools to be partially overlapping. For example, the lines 318 and 320 overlap with the line 312. Because the marks were made with different tools, the image completions for their respective areas are handled separately and do not interfere.

Figure 3G:

FIG. 3G shows a resulting image 330. Here, the image editor tool 110 (FIG. 1) has completed the hole by drawing image information from the areas indicated by the user's markings. The image completion can be performed using a patch-based optimization algorithm, as described above. For example, patches from the outside-region part can be randomly distributed in the inside-region part, and this mapping can then be refined using iterative phases of good-mapping propagation and random mappings. The remaining parts of the hole that are not included in any of the user's markings are thereafter filled using the same patch-based optimization algorithm. That is, the same hole-filling technique is applied throughout the hole, but for the marked areas its draws reference only from the other corresponding marked area(s).

Figure 4:
FIG. 4 shows another example of image modifications.
Figure 4:
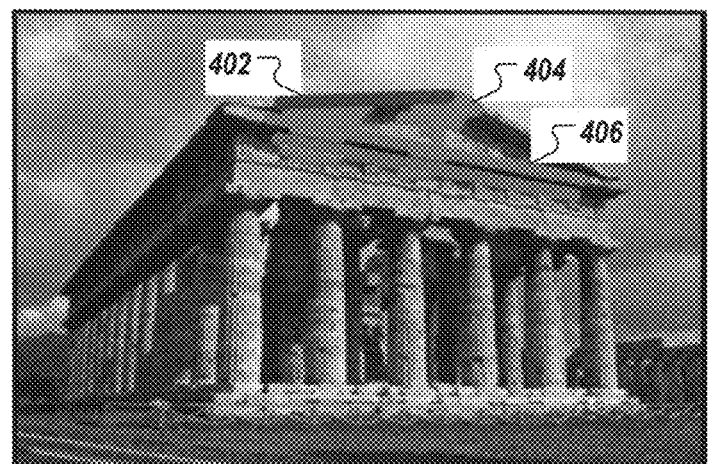
Figure 4:
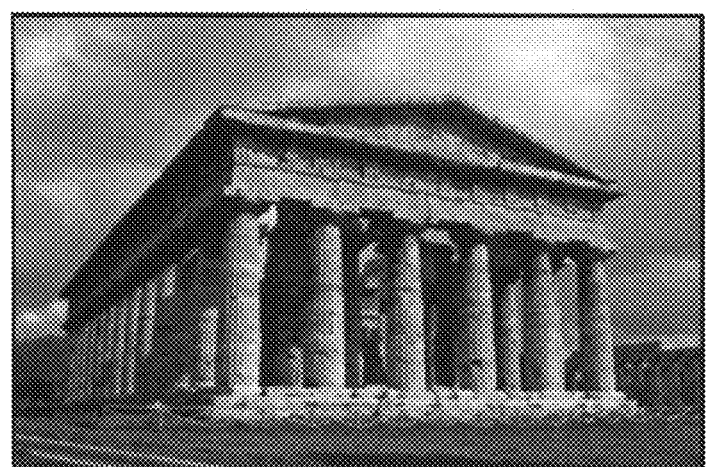

FIG. 4 shows another example of image modifications. Here, a photograph of the second temple of Hera at Paestum is shown in image 400A. There is no hole in the image to be filled; rather, the temple is missing some structure and the user wants the system (e.g., the image editor component 110 in FIG. 1) to perform image modification to address this situation.

As shown in image 400B, the user can make one or more markings to define semantics for how the missing structure should be created. Here, the user creates a line 402 to define where image information for restoring the raking cornice should be obtained. Particularly, the line 402 is drawn along the piece of the structure that is intact and extends into the area where material is missing in the physical structure. Thus, the system will look only to the intact structure piece, because it has been marked by the user, to find image patches for re-creating the part of the physical structure that is missing. Similarly, the user creates a marking 404 for portions of the pediment that are missing in the physical object, and a line 406 for missing pieces of the cornice.

Image 400C shows the result of the image modification. As can be seen, the raking cornice, the pediment and the cornice have been restored by adding image patches to those places where physical structure was missing. Because the respective information sources for these areas had been semantically defined by the user, the result looks natural and plausible.

Figure 5A:
FIGS. 5A-D show another example of image modifications.

FIG. 5A shows another example of image modification. Here, an initial image 500 is a photograph of a garden with a lawn, a sundial pedestal and a stone wall in the background that has a portal in it. The user in this example wishes to remove the pedestal and the portal, and generate a natural-looking modified image.

Figure 5B:
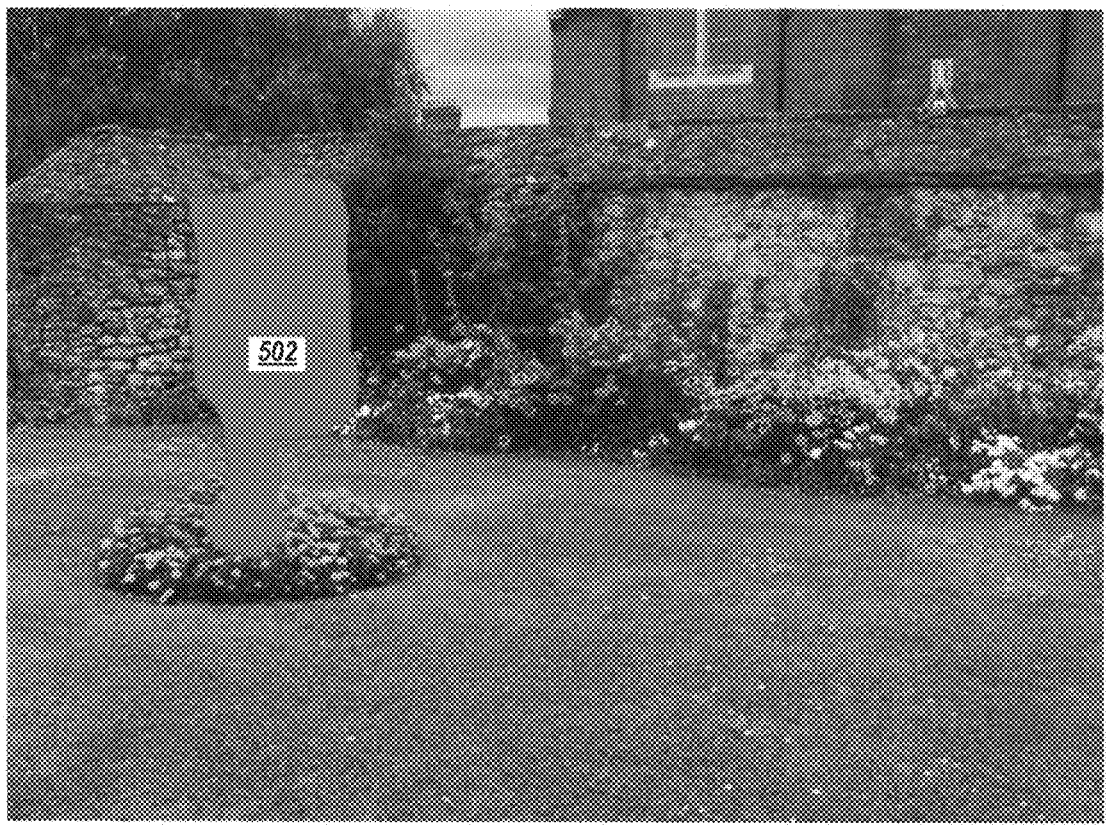
Figure 5C:

FIG. 5B shows that the user has removed the pedestal and the portal, leaving a hole 502. The purpose of the image modification is to select content elsewhere in the image in an organized way and fill the hole 502 with that content. FIG. 5C shows that the user can enter one or more marks to define the search space for the modification process. Here, the user enters a mark 504 to guide the hole-filling process for an edge of the wall that is to continue at the top of the hole. The user enters a mark 506A inside the hole and a corresponding mark 506B outside the hole. The mark 506B indicates where the image content for the area of the mark 506A will be selected. Similarly, user enters a mark 508A inside the hole and a corresponding mark 508B outside the hole. The mark 508B indicates where the image content for the area of the mark 508A will be selected. The user employs separate marking tools for the respective marks, as indicated by the different colors of the marks.

Figure 5D:

The content selection for filling the hole is performed using a patch-based optimization algorithm aided by the semantic guidance the user has created by entering the marks. FIG. 5D shows a modified image 510 that results after the patch-based optimization algorithm. Here, content has been filled into the hole 502 corresponding to all of the marks 504, 506A and 508A, as well as in a remainder of the hole 502 that the user did not mark, which remainder the patch-based optimization algorithm fills by referring to any area of the image, as guided by the propagation phase and the random search phase therein.

Figure 6:
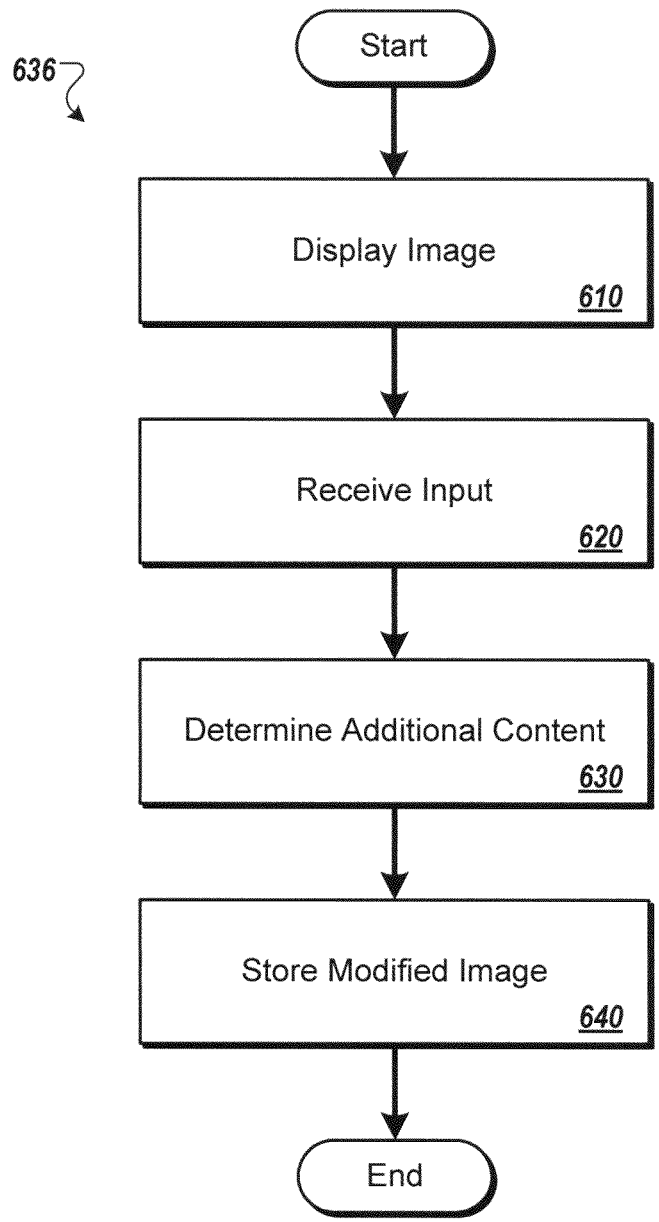
FIG. 6 shows a flowchart of an example method.

FIG. 6 shows an example method 600 of generating a modified image. The method 600 can be performed by a processor executing instructions stored in a tangible computer-readable medium, for example in the system 100 (FIG. 1). One or more additional steps can be performed.

Step 610 involves displaying an image in a computer system. For example, any or all of the images 200, 302A and 400A can be displayed in the GUI 104 (FIG. 1). The image includes contents that have a feature visible therein, the contents having a region thereof defined to be provided with additional content in generating a modified image. For example, the images 200 and 302A can have holes defined in them, such as from removing some image content. As another example, structure can be missing from the physical object that is shown in the image, such as in the image 400A.

Step 620 involves receiving an input that includes a semantic mark to be placed on the image that indicates at least part of the feature. For example, the user can employ the tool 306 using the input device 110 to make any of the marks 208, 210, 212, 312-16, 320-22 and 402-06. The semantic mark indicates an inside-region part inside the region and an outside-region part outside the region. For example, the marks 208, 210, 212, 312-16, 320-22 and 402-06 are placed so that they indicate respective inside-region parts and outside-region parts of the respective holes or regions of missing structure. The outside-region part can be located in the same image or in another image.

Step 630 involves determining the additional content for the region using a patch-based optimization algorithm applied to the image. For example, the image editor component 110 (FIG. 1) can apply a patch-based optimization algorithm. The patch-based optimization algorithm identifies the additional content for the inside-region part based on the outside-region part and not on an area of the image that the semantic mark does not indicate. The patch-based optimization algorithm identifies the additional content for a remainder of the region without being restricted to the outside-region part.

Step 640 involves storing the modified image having the additional content in the region. For example, any or all of the images 330 or 400C, or the image that results when the hole 202 has been filled in the image 200, can be stored in the repository 108 (FIG. 1).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory-feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
 displaying, by a computer system, an image having a region to which content is to be provided in generating a modified image and an outside region, wherein the region has a first sub-region and a second sub-region, wherein the outside region at least partially surrounds the region;

receiving an input comprising a semantic mark to be placed on the image, the semantic mark indicating the first sub-region and the outside region;

determining, by the computer system applying a patch-based optimization algorithm to the image, first content to be added to the first sub-region and second content to be added to the second sub-region adjacent to the first sub-region, wherein determining the first content and the second content comprises:

restricting, based on the semantic mark indicating the first sub-region and the outside region, the patch-based optimization algorithm to using the outside region for determining the first content such that an area of the image other than the outside region is not used to identify the first content, identifying, using the patch-based optimization algorithm, the first content based on the outside region to which the patch-based optimization algorithm is restricted and not based on the area of the image that the semantic mark does not indicate, and identifying the second content for the second sub-region without being restricted to the outside region; and generating the modified image by modifying the image to include the identified first content in the first sub-region and the identified second content in the second sub-region.

2. The method of claim 1, wherein the first sub-region comprises a hole in the image without the content and wherein the modified image is generated in a hole-filling process that includes the patch-based optimization algorithm.

3. The method of claim 2, wherein the hole is filled such that a feature from the outside region extends into the first sub-region that lacks the content prior to performing the hole-filling process.

4. The method of claim 1, wherein the image is a photograph depicting a physical object, and wherein the region is defined corresponding to a structure of the physical object that is missing from the image.

5. The method of claim 1, wherein the semantic mark is made using at least one of a line tool, an arc tool, a brush tool, an area-selection tool, or combinations thereof.

6. The method of claim 1, wherein the input specifies that a first part of the semantic mark is placed inside the region to indicate the first sub-region and a second part of the semantic mark is placed outside the region to indicate the outside region.

7. The method of claim 1, wherein an identifying characteristic is assigned to the semantic mark, the identifying characteristic distinguishing the semantic mark from an additional semantic mark in the image such that the patch-based optimization algorithm the semantic mark separately from the additional semantic mark.

8. The method of claim 7, wherein the semantic mark and the additional semantic mark cross each other and the patch-based optimization algorithm the semantic mark separately from the additional semantic mark.

9. The method of claim 1, further comprising receiving an additional input that defines an additional semantic constraint for the patch-based optimization algorithm.

10. The method of claim 9, wherein the additional semantic constraint includes at least one of:

a first search-space restriction defined for a coherence aspect of the patch-based optimization algorithm, the first search-space restriction excluding at least a first area of the image from being used in the content to be added to the first sub-region; and a second search-space restriction defined for a completeness aspect of the patch-based optimization algorithm, the second search-space restriction requiring the content to be complete with regard to a second area of the image indicated by the second search-space restriction.

11. The method of claim 1, further comprising receiving an additional input comprising an additional semantic mark that indicates an additional region from an additional image separate from the image, wherein determining the first content further comprises:

restricting, based on the additional semantic mark indicating the additional region, the patch-based optimization algorithm to using the additional region for determining the first content such that an area of the additional image other than the additional region is not used to identify the first content, and identifying, using the patch-based optimization algorithm, the first content based on the outside region to which the patch-based optimization algorithm is restricted and not based on the area of the additional image that the additional semantic mark does not indicate.

12. A computer system comprising:

a processing device; and a non-transitory computer-readable medium, wherein the processing device is configured to execute instructions stored on the non-transitory computer-readable medium and thereby perform operations comprising:

displaying an image having a region to which content is to be provided in generating a modified image and an outside region, wherein the region has a first sub-region and a second sub-region, wherein the outside region at least partially surrounds the region;

receiving an input comprising a semantic mark to be placed on the image, the semantic mark indicating the first sub-region and the outside region;

determining, by applying a patch-based optimization algorithm to the image, first content to be added to the first sub-region and second content to be added to the second sub-region adjacent to the first sub-region, wherein determining the first content and the second content comprises:

restricting, based on the semantic mark indicating the first sub-region and the outside region, the patch-based optimization algorithm to using the outside region for determining the first content such that an area of the image other than the outside region is not used to identify the first content, identifying, using the patch-based optimization algorithm, the first content based on the outside region to which the patch-based optimization algorithm is restricted and not based on the area of the image that the semantic mark does not indicate, and identifying the second content for the second sub-region without being restricted to the outside region; and generating the modified image by modifying the image to include the identified first content in the first sub-region and the identified second content in the second sub-region.

13. The computer system of claim 12, wherein the first sub-region comprises a hole in the image without the content and wherein processing device is configured for generating the modified image by executing a hole-filling process that includes the patch-based optimization algorithm.

14. The computer system of claim 13, wherein the hole is filled such that a feature from the outside region extends into the first sub-region that lacks the content prior to the hole-filling process being executed.

15. The computer system of claim 12, wherein the image is a photograph depicting a physical object, and wherein the region is defined corresponding to a structure of the physical object that is missing from the image.

16. The computer system of claim 12, wherein the input specifies that a first part of the semantic mark is placed inside the region to indicate the first sub-region and a second part of the semantic mark is placed outside the region to indicate the outside region.

17. A non-transitory computer-readable medium storing program instructions that are executable by a processing device, the program instructions comprising:
   program instructions for displaying an image having a region to which content is to be provided in generating a modified image and an outside region, wherein the region has a first sub-region and a second sub-region, wherein the outside region at least partially surrounds the region;
   program instructions for receiving an input comprising a semantic mark to be placed on the image, the semantic mark indicating the first sub-region and the outside region;
   program instructions for determining, by applying a patch-based optimization algorithm to the image, first content to be added to the first sub-region and second content to be added to the second sub-region adjacent to the first sub-region, wherein determining the first content and the second content comprises:
      restricting, based on the semantic mark indicating the first sub-region and the outside region, the patch-based optimization algorithm to using the outside region for determining the first content such that an area of the image other than the outside region is not used to identify the first content,
      identifying, using the patch-based optimization algorithm, the first content based on the outside region to which the patch-based optimization algorithm is restricted and not based on the area of the image that the semantic mark does not indicate, and
      identifying the second content for the second sub-region without being restricted to the outside region; and
   program instructions for generating the modified image by modifying the image to include the identified first content in the first sub-region and the identified second content in the second sub-region.

18. The non-transitory computer-readable medium of claim 17, wherein an identifying characteristic is assigned to the semantic mark, the identifying characteristic distinguishing the semantic mark from an additional semantic mark in the image such that the patch-based optimization algorithm the semantic mark separately from the additional semantic mark.

19. The non-transitory computer-readable medium of claim 18, wherein the semantic mark and the additional semantic mark cross each other and program instructions further comprise program instructions for executing the patch-based optimization algorithm such that the patch-based optimization algorithm the semantic mark separately from the additional semantic mark.

20. The non-transitory computer-readable medium of claim 17, further comprising program instructions for receiving an additional input that defines an additional semantic constraint for the patch-based optimization algorithm, wherein the additional semantic constraint includes at least one of:
   a first search-space restriction defined for a coherence aspect of the patch-based optimization algorithm, the first search-space restriction excluding at least a first area of the image from being used in the content to be added to the first sub-region; and
   a second search-space restriction defined for a completeness aspect of the patch-based optimization algorithm, the second search-space restriction requiring the content to be complete with regard to a second area of the image indicated by the second search-space restriction.

\* \* \* \* \*